United States Patent

Nilsson

[11] Patent Number: 4,531,427
[45] Date of Patent: Jul. 30, 1985

[54] APPARATUS WITH A PLANETARY GEAR SET

[75] Inventor: Sven W. Nilsson, Partille, Sweden

[73] Assignee: SKF Nova AB, Gothenburg, Sweden

[21] Appl. No.: 579,446

[22] Filed: Feb. 13, 1984

Related U.S. Application Data

[63] Continuation of Ser. No. 259,076, Apr. 30, 1981, abandoned.

[30] Foreign Application Priority Data

Nov. 8, 1980 [SE] Sweden ............................ 8005643

[51] Int. Cl.³ .............................................. F16H 37/06
[52] U.S. Cl. .................................. 74/675; 74/388 PS;
74/626; 74/498; 74/788; 180/79.1
[58] Field of Search .................... 74/674, 675, 388 R,
74/388 PS, 626, 686, 498, 788, 792; 180/79.1;
310/83

[56] References Cited

U.S. PATENT DOCUMENTS

| 1,086,797 | 2/1914 | Trotter | 310/83 |
|---|---|---|---|
| 1,780,150 | 11/1930 | Ahlm | 74/686 |
| 1,836,298 | 12/1931 | Winther | 74/788 |
| 1,870,076 | 8/1932 | Thomson | 74/686 |
| 2,027,218 | 1/1936 | Armington | 74/686 |
| 2,436,936 | 3/1948 | Page | 74/686 |
| 2,445,342 | 7/1948 | Trofimov | 74/686 |
| 2,701,973 | 2/1955 | Mackmann | 74/626 |
| 3,266,341 | 8/1966 | Lucky | 74/626 |
| 3,468,193 | 9/1969 | O'Mahony | 74/686 |
| 3,511,104 | 5/1970 | Piat | 74/388 PS |
| 3,534,623 | 10/1970 | Goodacre et al. | 74/388 |
| 3,823,620 | 7/1974 | Bricout | 74/686 |
| 3,824,874 | 7/1974 | Georges | 74/626 |
| 4,301,739 | 11/1981 | Mehren et al. | 180/79.1 |

FOREIGN PATENT DOCUMENTS

| 33478 | 5/1928 | France | 74/686 |
|---|---|---|---|
| 1117510 | 5/1956 | France | 74/686 |
| 1096738 | 12/1967 | United Kingdom | 310/83 |

Primary Examiner—Allan D. Herrmann
Assistant Examiner—Joseph M. Rolnicki
Attorney, Agent, or Firm—Eugene E. Renz, Jr.

[57] ABSTRACT

The invention relates to an apparatus incorporating a planetary gear set with a shaft (7) connected to a planet wheel support (6), and a shaft (8) connected to a sun wheel (5), one of the shafts (8) being connected to a rotor in a device (9) for providing a torque. In order to be able to use the apparatus in a favorable manner in for example a servo assisted system with a steering wheel (10) and a steering member actuated by the steering wheel via a step-up gear, the stator part of the device (9) for providing a torque is connected to the other one of the shafts (7) in the planetary gear so that this shaft takes up the reactive torque which is established in the device during operation.

3 Claims, 1 Drawing Figure

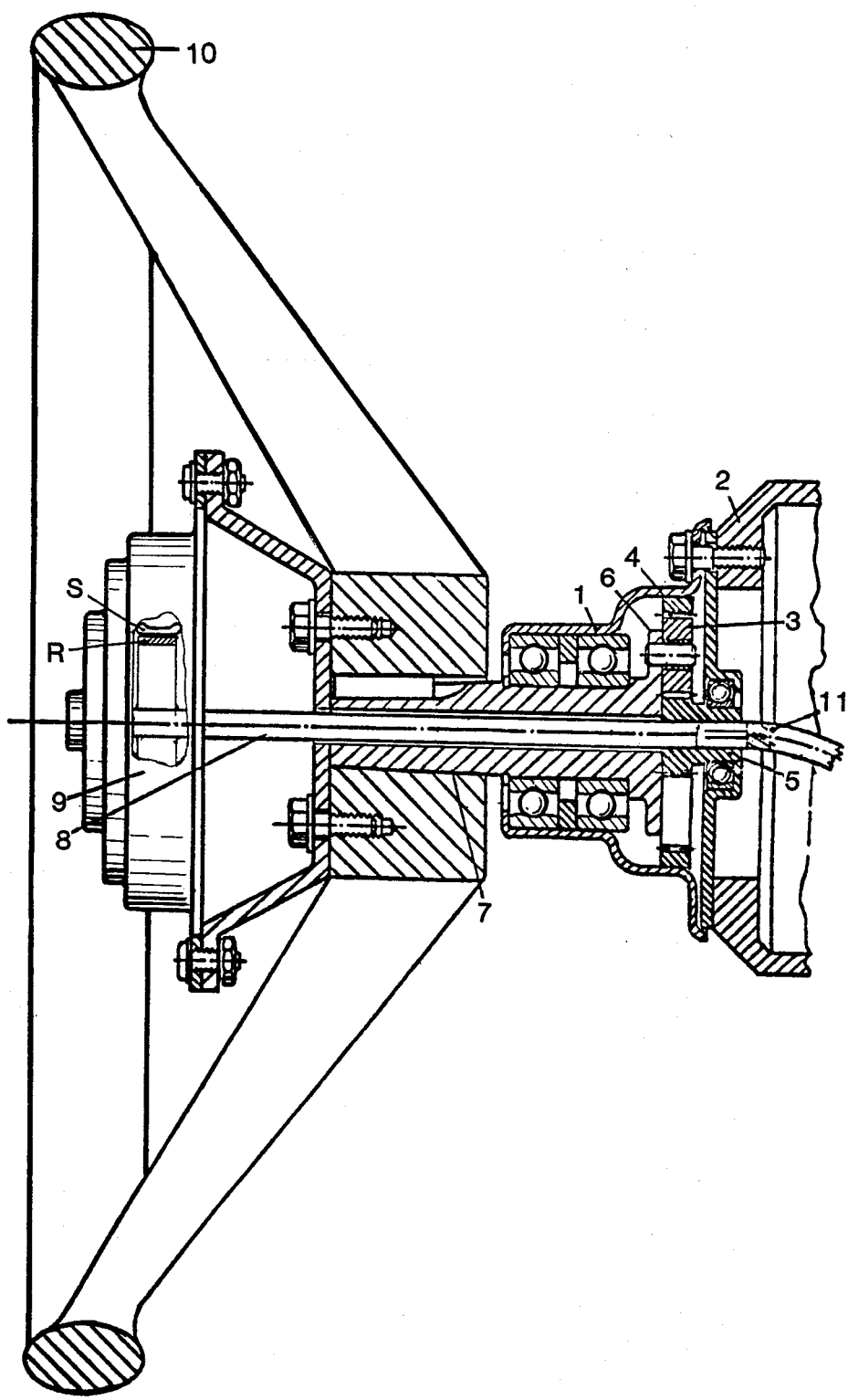

APPARATUS WITH A PLANETARY GEAR SET

This is a continuation of application Ser. No. 06/259,076 filed Apr. 30, 1981, now abandoned.

The invention relates to an apparatus incorporating a planetary gear set with a shaft connected to a planet wheel support, and a shaft connected to a sun wheel, one of the shafts being connected to a rotor in a device for providing a torque.

A planetary gear set is generally co-operating with a driving torque generating member such as a motor with a rotating output shaft, and a driven member in such a way that the output shaft of the motor is connected to the input shaft of the gear, and the output shaft of the gear is connected to the input shaft of the driven member. The motor is generally rigidly connected to the gear housing, which thus takes up the reactive torque from the motor. The input and the output shafts of the gear are as a rule connected to a planet wheel support and a sun wheel, respectively, or vice versa.

In some applications comprising a driving motor and a gear connected to the motor, such an arrangement is, however, unnecessarily complicated and bulky.

The purpose of the present invention is to provide an apparatus of the kind described in the introduction, which apparatus can have a very simple and compact design and which is very reliable in operation.

To this end, in accordance with the present invention, the combination comprises a planetary gear set including a sun wheel, a gear ring circumscribing the sun wheel mounted in a gear housing and at least one planet wheel in cooperating engagement with the sun wheel and gear ring and disposed therebetween and a torque transmitting device such as a motor including a stator and a rotor. The system further includes a first shaft connected to the stator and planet wheel and a second shaft connected to the rotor and sun gear. By this arrangement, the first shaft operates to take up the reactive torque in the torque transmitting device.

The invention is suitable for use in a steering system comprising for example a servo mechanism, a slave steering mechanism and/or an auto-pilot steering mechanism, in which turning motions of the steering wheel is geared up and/or down, and in the following the invention is described in detail with reference to the accompanying drawing which shows a longitudinal section through such an embodiment.

The apparatus shown comprises a planetary gear set with a housing 1 which is fixed to a steering desk 2 or the like. The gear comprises, as usual, a number of planet wheels 3 which co-operate with a surrounding ring 4 arranged in the housing and with a sun wheel 5. The planet wheels are arranged on a planet wheel support 6, which is provided on a shaft 7. The sun wheel 5 is arranged on another shaft 8. A device in the form of a motor 9, e.g. an electric motor, for providing a torque, has a rotor R which is connected to the shaft 8 and a stator S which is connected to the shaft 7.

The shaft 8 is arranged in an axial bore in the shaft 7, whereby both shafts can be connected at the same side of the planetary gear set to the device for providing a torque. If therewith the shaft 7 is a steering wheel shaft in a steering system in which the planetary gear set is used for gearing up the steering wheel motions, as shown in the drawing in which the steering wheel has the reference numeral 10 and the shaft 7 can be described as the input shaft of the planetary gear set, the motor 9 can be attached directly to the steering wheel hub so that its stator S and cover follows the steering wheel motions, whereas the rotor R is connected to the central shaft 8, which constitutes an extension of the output shaft of the planetary gear set, which shaft is connected to a steering member via e.g. a flexible and fast rotating shaft 11. The shaft 11 can, in its turn, be connected to an actuator, not shown, used for turning of for example a rudder or wheels. The motor 9 may therewith be connected to e.g. an auto-pilot system or a remote control device, in which the motor drives the shaft 11 directly via shaft 8, while the shaft 7 and the steering wheel 10 rotates freely with a lower speed in relation to the rotation of shaft 8 due to the gear ratio in the planetary gear. The motor 9 may also be used as a servo motor and be connected in a manner known per se for driving in one or the other direction depending on the direction of a torque which is applied to the steering wheel 10. When no torque is applied to the steering wheel, the motor 9 is disconnected.

During manual steering without servo assistance, the motor 9 is disconnected and the shaft 8 rotates freely with the same speed as the speed of the shaft 11. A motor 9 in the form of a normal electric motor does not have to be provided with a special clutch in connection to the shaft 8, but the rotor R can be allowed to rotate with the shaft. Also when the motor 9 is connected, manual steering in any desired direction can take place with the steering wheel, since the torque of the motor is moderate and can easily be overcome by manually turning the steering wheel.

Other embodiments of the invention than the one described are also possible within the scope of the claims. For example, the device 9 for providing a torque may be a motor of another kind than the one described, and the apparatus may be used in other applications than steering systems, for example in driving devices for wheel vehicles with a driving motor mounted in a driving wheel. The planetary gear set can be of a different design and may for example comprise several gear stops.

What is claimed is:

1. The combination comprising a planetary gear set including a sun wheel, a gear ring circumscribing the sun wheel non-rotatably mounted in a gear housing and at least one planet wheel in cooperating engagement with the sun wheel and gear ring and disposed therebetween, a torque transmitting device including a stator and a rotor, a first shaft connected to said stator and said planet wheel and a second shaft connected to said rotor and sun wheel and an external rotatable member, said first shaft operable to take up the reactive torque in the torque transmitting device.

2. The combination as claimed in claim 1 wherein said first shaft is hollow and has an axial bore and said second shaft engages through said axial bore and wherein both shafts are connected at the same side of the planetary gear set to the torque transmitting device.

3. The combination as claimed in claim 1 wherein said first shaft is a steering wheel shaft connected to a steering wheel and said second shaft is a driving shaft for a steering member actuated by the motions of the steering wheel and wherein the stator of the torque transmitting device is mounted in fixed relation to the steering wheel and the rotor of which is connected for driving said second shaft.

* * * * *